United States Patent [19]
Wilson

[11] Patent Number: 6,070,554
[45] Date of Patent: Jun. 6, 2000

[54] FISH FEEDER

[76] Inventor: Steven Wilson, 124 Cairntrodlie, Peterhead, Aberdeenshire, AB42 2AX, United Kingdom

[21] Appl. No.: 09/277,194

[22] Filed: Mar. 26, 1999

[30] Foreign Application Priority Data

| Apr. 3, 1998 | [GB] | United Kingdom | ................... | 9807241 |
| Feb. 5, 1999 | [GB] | United Kingdom | ................... | 9902597 |

[51] Int. Cl.⁷ .................................................. A01K 61/02
[52] U.S. Cl. ..................................... 119/51.04; 119/51.01; 119/230
[58] Field of Search .............................. 119/51.01, 51.04, 119/230

[56] References Cited

U.S. PATENT DOCUMENTS

| 3,314,396 | 4/1967 | Willinger | .............................. | 119/51.04 |
| 3,499,526 | 3/1970 | Willinger | ................................. | 426/115 |
| 3,993,028 | 11/1976 | Baensch et al. | ...................... | 119/51.04 |
| 5,128,153 | 7/1992 | Axelrod | ..................................... | 426/2 |
| 5,143,020 | 9/1992 | Patrick | ..................................... | 422/265 |
| 5,259,533 | 11/1993 | Kornfein et al. | ....................... | 222/170 |
| 5,954,012 | 9/1999 | Jackson | ................................... | 119/230 |

*Primary Examiner*—Peter M. Poon
*Assistant Examiner*—Judith A. Nelson
*Attorney, Agent, or Firm*—Fleshner & Kim, LLP

[57] ABSTRACT

A semi-submersible fish feeder (1) for use in fish farms and aquariums which provides a feeding chamber (3) that floats below the surface of water and thereby enables edible materials such as food or medicine to be more controllably and evenly distributed to fish. A buoyancy aid (2) and ballast chamber (7) allow the depth of the feeding chamber within the water to be controlled. The feeding chamber is typically a volume of edible material enclosed by a net (10) through which fish can eat.

12 Claims, 3 Drawing Sheets

FISH FEEDER

The present invention relates to a fish feeder and in particular to a fish feeder for use in fish farms and aquariums.

In the United Kingdom the ownership of fish is one of the most popular pastimes with over 3 million households estimated to have either an aquarium or a pond.

However, the keeping of fish requires considerable care and attention as a result of their sensitivity to the surrounding conditions.

One area that traditionally requires a great deal of attention is that of feeding. For example, overfeeding is known to be a common cause of death amongst fish in domestic aquariums.

Furthermore, overfeeding can result in an excess of food remaining in the water, resulting in the development of infection on the scales of the fish. This is a particularly serious problem that fish owners have to address.

When the aquarium contains tropical fish the additional problems of the diet of the fish and the need for special aeration and filtration of the water have to be addressed.

For example, water circulation or treatment can result in the food being drawn into the filter with the effect that the amount available for feeding is insufficient to meet the needs of the fish in the aquarium. In addition the filter can also become clogged and cease functioning properly.

It would therefore be desirable to be able to use a feeder which could release food in a controlled manner such that the fish could be adequately fed, without being overfed, and that the aquarium would not contain an excess of food.

It is an object of the present invention to provide a fish feeder that is semi-submersible, can be used as a means of providing food at controlled levels to ensure even distribution and aids effective water management.

It is a further object of the present invention to provide a fish feeder that is simple to use and easily cleaned.

According to the present invention there is provided a feeder comprising an edible material storage means adapted to allow edible material to be distributed to aquatic creatures and a buoyancy means adapted to enable the edible material storage means to float within a volume of water.

Preferably, the edible material storage means is adapted to contain edible material but allow aquatic creatures to eat the contained edible material.

More preferably, the edible material storage means comprises a volume that contains edible material and is enclosed by a net.

Most preferably, the edible material storage means is formed by a series of rods connecting a cap and a base with a net acting as an enclosure.

The edible material storage means may be opened to allow edible material to be added to the edible material storage means.

The buoyancy means may comprise a buoyancy aid.

Preferably, the buoyancy means further comprises a ballast chamber into which objects may be placed to control the depth at which the edible material storage means floats.

More preferably, the feeder is adapted to float such that the buoyancy means is positioned above the edible material storage means and the ballast chamber is positioned below the edible material storage means when the feeder is floating in water.

Preferably, the feeder is provided with a gripping aid to make it easier to remove from water.

Typically, the feeder is provided with a location marker means which makes it easier to locate the feeder in a volume of water.

The edible material storage means may be adapted to release some of its contents into surrounding water at predetermined intervals.

The feeder may be adapted to release edible material into the edible material storage means at predetermined intervals.

The edible material may comprises medicine.

In order to provide a better understanding of the present invention, an embodiment will now be described by way of example only with reference to the accompanying Figures in which.

Figure 1:
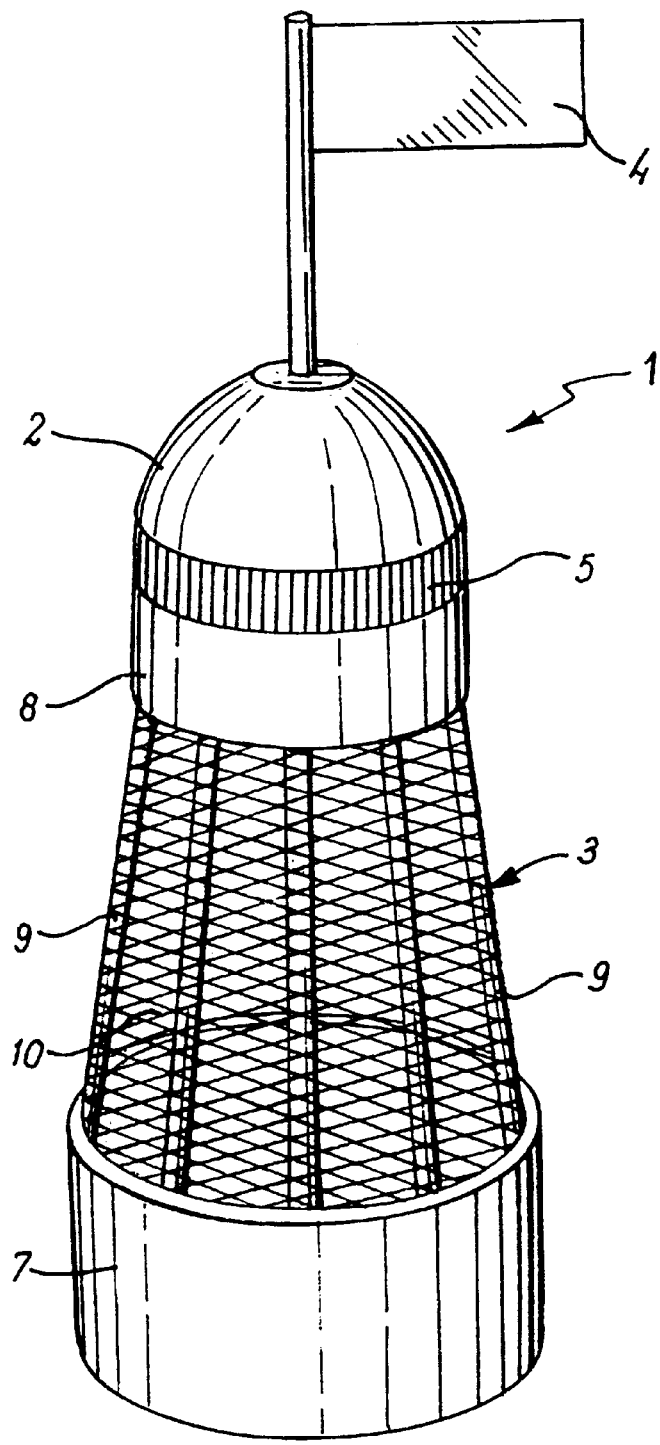
FIG. 1 illustrates a perspective view of a fish feeder.
Figure 2:
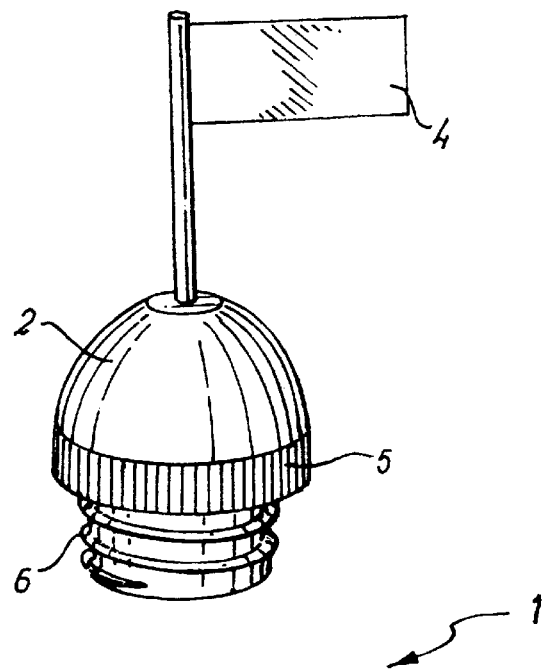
FIG. 2 illustrates a side view of the buoyancy aid and the feeding chamber of a fish feeder.
Figure 2:
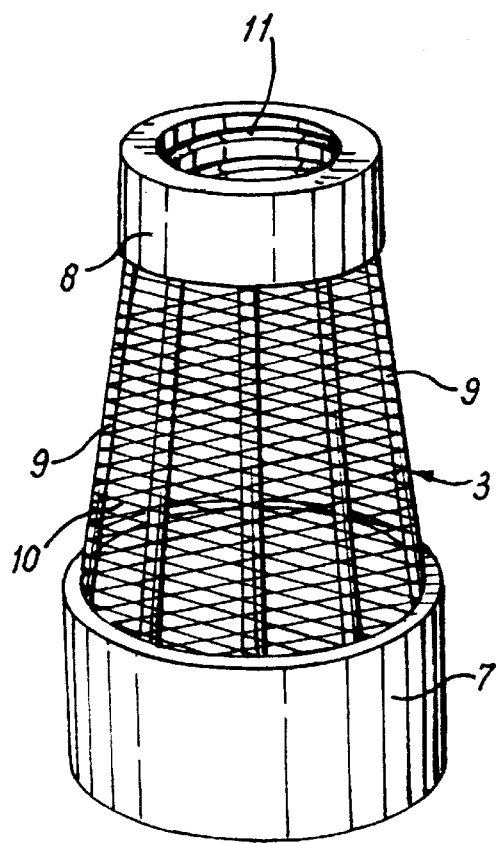

Referring firstly to FIGS. 1 and 2, a fish feeder is generally depicted at 1 comprising a buoyancy aid 2 and a feeding chamber 3.

The buoyancy aid 2 is provided with a flag 4, a gripping aid 5 and a screw 6 for connection with the feeding chamber 3.

The feeding chamber 3 comprises a ballast chamber 7, a cap 8, rods 9 and a net covering 10. Both the ballast chamber 7 and the cap 8 are provided with holes (not shown) into which are inserted the rods 9. The net covering 10 is passed round the rods 9 to enclose the feeding chamber 3. The cap 8 is also provided with a thread 11 to receive the screw 6 of the buoyancy aid 2.

Figure 3:
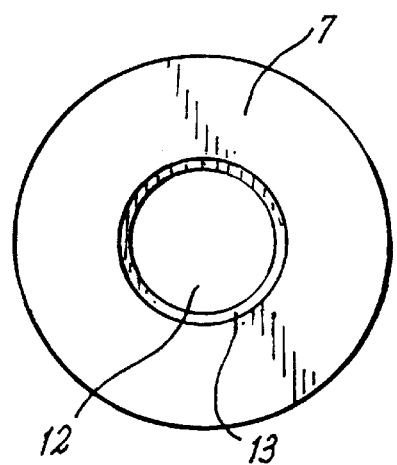
FIG. 3 illustrates a bottom view of a fish feeder.

FIG. 3 illustrates a view of the underside of the ballast chamber 7. The ballast chamber 7 is provided with an opening 12 and a rim 13 to receive a plug 14 (not shown).

Figure 4:
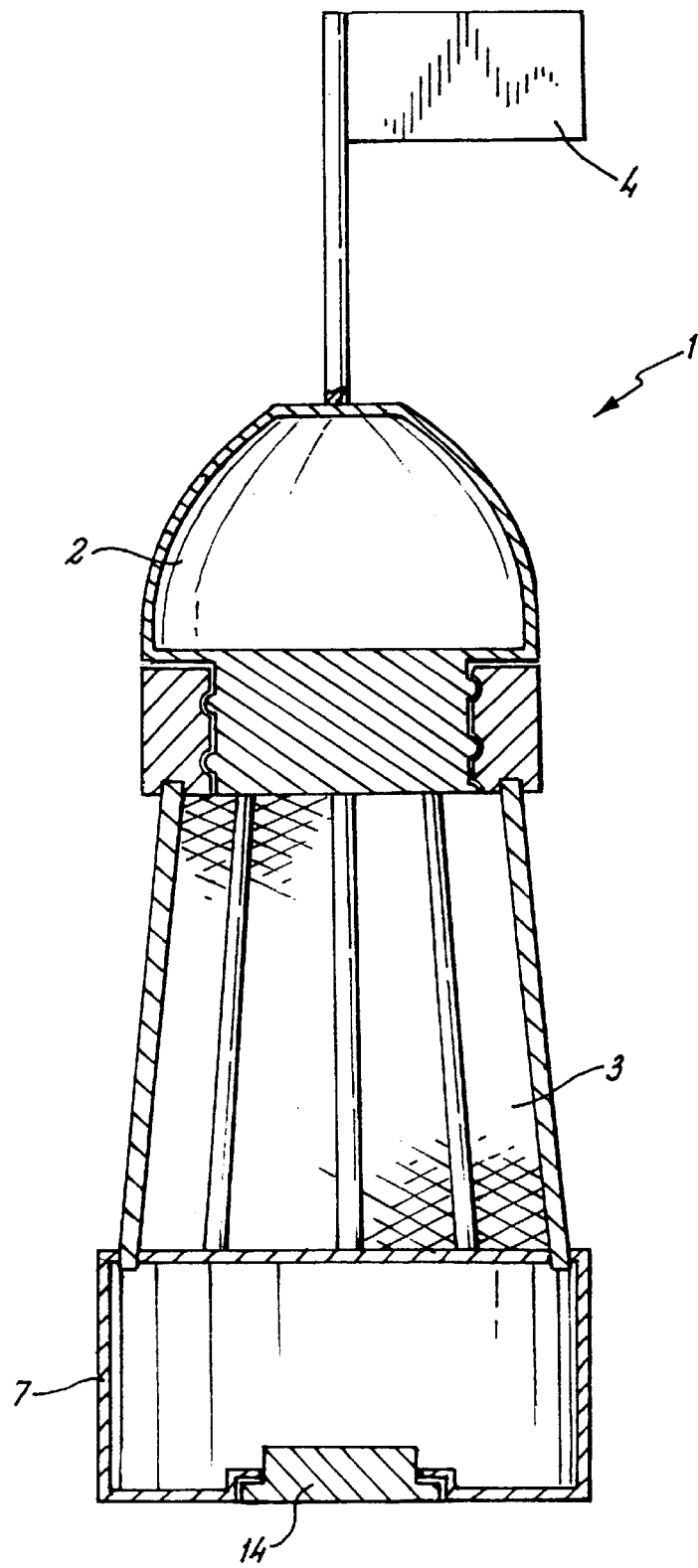
FIG. 4 illustrates a cross section of a fish feeder.

FIG. 4 illustrates a side view of the fish feeder 1 with the feeding chamber 3 and the buoyancy aid 2 connected and the plug 14 in position.

The fish feeder 1 may be used in the following way. The buoyancy aid 2 is unscrewed from the feeding chamber 3 and food is placed into the chamber 3. The feeder 1 is then re-assembled and ballast material, for example sand, is placed in the ballast chamber 7 through the opening 12. The plug 14 keeps the ballast material inside the ballast chamber 7.

The feeder 1 is then immersed in a bowl of water to ensure that the level of added ballast material is sufficient to submerge it to the required depth. The ballasting of the feeder 1 can be adjusted if desired.

The feeder 1 is then submerged in the tank and the food passes from the chamber 3 through the net covering 10 into the water where it can be consumed by the fish.

As the feeder 1 is not fixed, the feeding of the fish causes it to move round the aquarium, which has the effect of distributing the food more evenly.

Furthermore, as the feeder 1 moves through the tank, and is followed by top and middle feeding fish, food will be able to fall to depths where bottom-feeding fish are found.

Once all the food has dispersed, the feeder 1 can be removed from the tank. The flag 4 serves the dual purpose of acting both as a marker for the location of the feeder and also as a means for its removal from the water. The feeder 1 is then dismantled and can be cleaned.

The feeder 1 can also be used as a means for dispensing medicine.

An advantage of the present invention is that there is provided a fish feeder that is easy to use, lightweight and inexpensive to manufacture.

A further advantage of the present invention is that the levels of ballasting can be altered such that the feeder operates at different depths.

A further advantage of the present invention is that there is provided a fish feeder which can be used as part of a programme of effective water management. The controlled release of food prevents any excess accumulating in the water and accordingly hinders the development of disease by improving the hygiene of the aquarium.

A yet further advantage of the present invention is that there is provided a controlled method of feeding fish.

In an alternative embodiment the fish feeder is provided with a timing device to allow the food to be released from the feeding chamber at predetermined intervals. An advantage of this embodiment is that the feeder could be used during holiday periods when feeding may become irregular.

In a further alternative embodiment the mesh of the net covering is of a different size to meet the requirements of the feeding process.

An alternative feature that may be incorporated into the fish feeder is that the buoyancy aid may be adapted to act as a food store which can release its contents at pre-determined intervals.

Further modifications and improvements may be added without departing from the scope of the invention herein intended.

What is claimed is:

1. A feeder comprising:
   a storage means having edible material to allow the edible material to be distributed to aquatic creatures;
   a buoyancy means attached to said storage means, said buoyancy means enabling said storage means to float within a volume of water; and
   a location marker attached on top of said buoyancy means, enabling the feeder to be easily located within the volume of water.

2. The feeder according to claim 1, wherein the storage means is formed by a net.

3. The feeder according to claim 2, wherein the storage means comprises a cap at its first end and a base at its second end, and said storage means is enclosed by a net which is attached to said cap and said bases, forming a volume therebetween, said net is supported by a series of rods attached to said cap and said base.

4. The feeder according to claim 3, wherein one end of the storage means may be opened to allow edible material to be added to the storage means.

5. The feeder according to claim 1, wherein the buoyancy means comprises a buoyancy aid.

6. The feeder according to claim 5, wherein the buoyancy means further comprises a ballast chamber into which objects may be placed to control the depth at which the storage means floats.

7. The feeder according to claim 5 adapted to float such that the buoyancy means is positioned above the storage means and the ballast chamber is positioned below the storage means when the feeder is floating in water.

8. The feeder according to claim 1, wherein the feeder is provided with a gripping aid to make it easier to remove from water.

9. The feeder according to claim 1, wherein the storage means is adapted to release some of its contents into surrounding water at predetermined intervals.

10. The feeder according to claim 9, wherein the edible material is released into the storage means at predetermined intervals.

11. The feeder according to claim 1, wherein thy edible material comprises medicine.

12. Thee feeder according to claim 1, wherein said location marker is a flag.

* * * * *